US010489768B2

(12) United States Patent
Szeto et al.

(10) Patent No.: US 10,489,768 B2
(45) Date of Patent: Nov. 26, 2019

(54) KEYBOARD APPLICATION WITH THIRD PARTY ENGAGEMENT SELECTABLE ITEMS

(71) Applicant: Visa International Service Association, San Francisco, CA (US)

(72) Inventors: Margaret Szeto, Mountain View, CA (US); Peng Zhao, San Jose, CA (US); Prerak Diwakar Trivedi, Foster City, CA (US); Dziyana Nikolaevna Klimovich, Foster City, CA (US); Yobel Muchang, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 603 days.

(21) Appl. No.: 14/985,067

(22) Filed: Dec. 30, 2015

(65) Prior Publication Data

US 2017/0193481 A1 Jul. 6, 2017

(51) Int. Cl.
*G06Q 20/20* (2012.01)
*G06Q 20/38* (2012.01)
(Continued)

(52) U.S. Cl.
CPC ....... *G06Q 20/206* (2013.01); *G06Q 20/3274* (2013.01); *G06Q 20/3821* (2013.01);
(Continued)

(58) Field of Classification Search
CPC .......... G06Q 20/4012; G06Q 20/3274; G06Q 20/3821; G06Q 20/405; G06Q 20/206;
(Continued)

(56) References Cited

U.S. PATENT DOCUMENTS 5,983,200 A * 11/1999 Slotznick ............. G06Q 10/025
  705/1.1
6,108,640 A * 8/2000 Slotznick ................ G06F 17/21
  704/9
(Continued)

FOREIGN PATENT DOCUMENTS

JP  2007226794     9/2007
KR  1020130100527  9/2013
KR  1020150051409  5/2015

OTHER PUBLICATIONS

PCT/US2016/058105, "International Search Report and Written Opinion", dated Feb. 6, 2017, 14 pages.
(Continued)

*Primary Examiner* — Andrew Joseph Rudy
(74) *Attorney, Agent, or Firm* — Kilpatrick Townsend & Stockton LLP (57) ABSTRACT

Embodiments of the invention are directed to an embodiment of a keyboard application in which a plurality of selectable items (representing keys) are associated with transactions. The keyboard application may be imported into any application that utilizes text input, and replaces a default keyboard used to provide the text input. Upon selection of one of the plurality of selectable items, a transaction is initiated by a service provider computer. In some embodiments, the transaction may result in the engagement of a third party entity. Once completed, an access credential associated with the completion of the transaction is generated. The access credential may be entered into the text input field of the application that utilizes text input.

15 Claims, 7 Drawing Sheets

(51) Int. Cl.
*G06Q 20/40* (2012.01)
*H04M 1/725* (2006.01)
*G07F 7/10* (2006.01)
*G07F 9/02* (2006.01)
*G06Q 20/32* (2012.01)

(52) U.S. Cl.
CPC ....... *G06Q 20/405* (2013.01); *G06Q 20/4012* (2013.01); *G07F 7/1041* (2013.01); *G07F 9/023* (2013.01); *H04M 1/72552* (2013.01)

(58) Field of Classification Search
CPC ...... G07F 7/1041; G07F 9/023; G07F 1/3203; H04M 1/72552
USPC ......... 705/18, 1.1, 26.64, 313; 715/764, 773
See application file for complete search history.

(56) References Cited

U.S. PATENT DOCUMENTS

| | | | | |
|---|---|---|---|---|
| 7,437,312 | B2* | 10/2008 | Bhatia | G06Q 30/06 705/26.64 |
| 8,515,875 | B1* | 8/2013 | Murray | G06Q 30/0279 705/313 |
| 8,671,357 | B2* | 3/2014 | Spetalnick | G06F 17/276 715/773 |
| 9,052,894 | B2* | 6/2015 | Moore | G06F 1/3203 |
| 9,606,727 | B2* | 3/2017 | Seo | G06F 3/0233 |
| 9,690,479 | B2* | 6/2017 | Jeon | G06F 3/04886 |
| 9,720,955 | B1* | 8/2017 | Cao | G06F 3/04886 |
| 9,746,883 | B2* | 8/2017 | Lee | G06F 1/1641 |
| 9,811,171 | B2* | 11/2017 | Goktekin | G06K 9/3258 |
| 9,875,284 | B1* | 1/2018 | Amacker | G06F 16/24578 |
| 9,946,773 | B2* | 4/2018 | Mohsin | G06F 17/30554 |
| 10,055,731 | B2* | 8/2018 | Ni | G06F 21/51 |
| 10,067,670 | B2* | 9/2018 | Weaver | G06F 3/0484 |
| 10,146,318 | B2* | 12/2018 | Malzbender | G06F 3/017 |
| 2011/0179373 | A1 | 7/2011 | Moore et al. | |
| 2012/0054102 | A1 | 3/2012 | Schwartz et al. | |
| 2014/0316937 | A1 | 10/2014 | Jiao et al. | |

OTHER PUBLICATIONS

"Extensions-Fleksy", Avai,lable online at : https://fleksy.com/extensions/, Accessed from Internet on Oct. 15, 2015, 7 pages.

"Gyft: Buy, Send & Redeem Gift Cards Online or with Mobile App", Available online at : https://gyft.com/, Accessed from Internet on Oct. 15, 2015, 5 pages.

"Send/Re-send an eGift—Verizon Messages—Android", Available online at : http://www.verizonwireless.com/support/knowledge-base-138244, Accessed from Internet on Oct. 15, 2015, 4 pages.

"Venmo Application", Available online at : https://venmo.com/about/product/, Accessed from Internet on Oct. 15, 2015, 4 pages.

EP16882233.6 , "Extended European Search Report", dated Nov. 26, 2018, 8 pages.

* cited by examiner

KEYBOARD APPLICATION WITH THIRD PARTY ENGAGEMENT SELECTABLE ITEMS

CROSS-REFERENCES TO RELATED APPLICATIONS

NOT APPLICABLE

BACKGROUND

As mobile device users become increasingly accustomed to mobile device technology, they are demanding increased functionality and convenience. Often, software applications do not offer every feature that a particular user would like to utilize. In these situations, a user may often have to use several different applications to perform a single transaction. To do this, a user may need to minimize a first application, execute a second application, complete a transaction, and post the results of the transaction into the restored session for the first application. This can be frustrating and time consuming, especially for users who value convenience.

BRIEF SUMMARY

Embodiments of the present disclosure address these problems and other problems, individually and collectively. More particularly, embodiments of the present disclosure enable a user to implement a keyboard application with almost any application in which a keypad is used. For example, a user may import the described keyboard application into a messaging service application. Each selectable item of the keyboard application may be associated with a process, such that a selection of the selectable item may be used to initiate the process. In some embodiments, the process may be to perform a transaction with, or otherwise engage, a third party entity. In some embodiments, the keyboard application may be in communication, via the user device upon which it is executed, with a service provider.

In accordance with at least some embodiments, a user of the keyboard application may be associated with an account or user profile maintained on a server computer that is operated by the service provider. Upon creation of the account with the service provider, the user may provide enrollment data that includes demographic information as well as payment information for the user. For example, the user may, upon creating an account with the service provider, provide his or her name, billing address, phone number, credit card information, and any other suitable user-related information. Additionally, the user may be given a login and/or password to access the account. In some embodiments, the user may be required to log in to his or her account before a process may be initiated using the keyboard application. In some embodiments, the service provider may recognize the user of a user device based on an identifier for the user device. For example, the service provider may receive a request to initiate a process from an instance of the keyboard application installed on a cellular phone. The request may be associated with a phone number for the cellular phone. In this example, the service provider may identify the user and authorize the request based on the cellular phone number.

Upon receiving an indication that one or more selectable items have been selected by a user from the keyboard application, the service provider may initiate a transaction. In some embodiments, the transaction may be a process to engage a third party. For example, the service provider may initiate a transaction with the third party on the user's behalf using payment information maintained in relation to the user's account. By way of further example, the user may select a particular selectable item (representing a key) from the keyboard that causes the service provider to initiate a transaction with a third party entity. The transaction may subsequently be conducted using payment information stored in relation to the user's account. In some embodiments, the service provider may provide the payment information to the third party entity, which may subsequently submit an authorization request to a payment provider associated with the payment information. Upon receiving an authorization response, the third party entity may provide the service provider with a notification that the transaction has been approved or denied. If the transaction has been approved, then the third party entity may provide the service provider with an access credential, such as a link to the purchased product. The service provider may then communicate the access credential to the user device. In some embodiments, upon receiving the access credential, the keyboard application may place at least a portion of the access credential into a text input field.

By way of illustrative example, consider a keyboard application that includes a series of selectable items representing gift cards from various merchants. In this example, a user may import the keyboard application into an active communication session of a messaging application with which the user is engaged in a chat session. The user may then select one of the selectable items representing gift cards in order to initiate a purchase of the selected gift card. Upon receiving this selection, the service provider may conduct a purchase transaction of the selected gift card from the respective merchant using the user's payment information. The service provider may then provide a uniform resource locator (URL) to the user device that links to a webpage that includes information about the completed transaction. In this example, the URL may be input into the user's text input field of the messaging application so that it might be displayed to a second user in the chat window of the messaging application. In this way, a first user can quickly and easily provide an item to a second user via any available messaging application, and without exiting the messaging application or opening a second application to complete a transaction for the item.

Further details regarding embodiments of the invention can be found in the Detailed Description and the Figures.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing specific embodiments of the invention, some terms may be described in detail.

An "access credential" may be any data or portion of data used to gain access to a particular resource. In some embodiments, an access credential may be a login and/or password for a user account. In some embodiments, an access credential may include account information or a token associated with the account information. In some embodiments, an access credential may be a uniform resource locator (URL) that links to a webpage from which an item may be ordered or downloaded. In some embodiments, an access credential may be a machine-readable code (e.g., a barcode or QR code) which enables access to funds within a prepaid account.

An "acknowledgement" may be any indication that a transaction has been completed. For example, an acknowledgement may include text stating that a transaction has been completed. In some embodiments, an acknowledgement may include one or more access credentials. For example, an acknowledgement may state "The item has been purchased! To access this item, please visit www.example.com/123456." In this example, www.example.com/123456 may be an access credential.

An "authorization computer" may be any system involved in authorization of a transaction. The authorization computer may determine whether a transaction can be authorized and may generate an authorization response message including an authorization status (which also may be known as an authorization decision). In some embodiments, an authorization computer may be a payment account issuer computer. In some cases, the authorization computer may store contact information of one or more users. In other embodiments, the authorization computer may authorize non-financial transactions involving a user. For example, the authorization computer may make an authorization decision regarding whether the user can access a certain resource (e.g., an electronic document).

An "authorization request message" may be any electronic message that is sent to a payment processing network and/or an issuer of a payment account to request authorization for a payment transaction. An authorization request message according to some embodiments may comply with ISO 8583, which is a standard for systems that exchange electronic transaction information associated with a payment made by a consumer using an access credential or a payment account. An authorization request message may also comprise additional data elements corresponding to "identification information" including, for example, a service code, a CVV (card verification value), a dCVV (dynamic card verification value), an expiration date, etc. An authorization request message may also comprise "transaction data," such as any information associated with a current transaction (e.g., the transaction amount, merchant identifier, merchant location, etc.) as well as any other information that may be utilized in determining whether to identify and/or authorize a payment transaction.

An "authorization response message" may be any electronic message reply to an authorization request message generated by an issuing financial institution (i.e. issuer) or a payment processing network. The authorization response message may include an authorization code, which may be a code that an account issuing bank returns in response to an authorization request message in an electronic message (either directly or through the payment processing network) to a merchant's access device (e.g., point of sale terminal) that indicates approval of the transaction. The code may serve as proof of authorization. As noted above, in some embodiments, a payment processing network may generate and/or forward the authorization response message to the merchant. In some embodiments, the authorization response message may be associated with confirmation element data by a confirmation element identifier. In some cases, modified confirmation element data may be included in the authorization response message sent to an access device.

A "character" may be any symbol used in a language system. The term character may include punctuation, foreign characters (e.g., Kanji characters), emoticons, or any other suitable character type. For example, a character may be an American Standard Code for Information Interchange (ASCII) character, or an extended ASCII character.

A "keyboard application" may be any set of computer executable instructions that cause a computer to render a soft keyboard, or a visual on-screen image map (a graphic image defined so that different areas of the graphic image are mapped to different instructions). In some embodiments, a keyboard application may be used to replace a default keyboard of another application that allows for textual input. For example, a user may replace an English character keyboard with one that displays Chinese characters. In this example, a selection of a Chinese character from the keyboard application would result in that Chinese character being entered into a text input field that is currently in focus.

A "messaging application" may be any application that allows a user to enter text into a text input field. In some embodiments, a messaging application instantiated on a first device may allow a first user to communicate with a second user via a messaging application instantiated on a second user device. A graphical user interface for a messaging application may include a text input field and a display area that contains text input to the messaging application.

"Payment information" may be any information designed to provide access to an account for making payment transactions. For example, payment information may include a credit card number, a bank account number, a user id, a token, or any other suitable identifier. The payment information may be associated with a monetary value, a discount, or a store credit. In some embodiments, payment information may refer to a mileage plan or other reward point system. The payment information may also be associated with an entity such as a bank, a merchant, a payment processing network, or a person. For example, in some embodiments, payment information may identify a prepaid account (e.g., a gift card) or credit account with a third party entity.

To "render" may refer to any means of exhibiting or displaying material. For example, a graphical user interface may be rendered on the screen of a mobile device, such that a user is able to view it.

A "selectable item" may be any icon or image capable of being selected by a user. For example, a selectable item may comprise an image rendered on a display device that is capable of being interacted with. In some embodiments, a selectable item may be rendered on a touch-screen display of a user device. The selectable item may be selected by a user upon touching the display at the location that the selectable item is rendered.

A "service provider computer" may typically be a computer or cluster of computers maintained by a provider of a service. For example, the service provider computer can be a large mainframe, a minicomputer cluster, or a group of servers functioning as a unit to provide a service upon request. The service may be requested by a client device via a network connection. In one example, a service provider computer may be a database server coupled to a Web server. The service provider computer may be associated with an entity such as a merchant, a payment processing network, a wallet provider, a merchant, an authentication cloud, an acquirer, or an issuer.

A "text input field" may be any area of a rendered graphical user interface into which a user is able to enter text. For example, a text input field may be a search box, a note box, or any other suitable text entry box.

A "third party entity" is any entity that may be separate from a service provider. A third party entity may maintain a server or a cluster of servers, which may be in communication with a network. For example, a third party entity may be a retail provider that maintains an electronic item catalog of items offered for sale.

A "token" may be any pseudo-account number associated with a real account number. For example, a token may be a sequence of numbers and/or characters that is used in place of an actual account number. In this example, a token issuer may maintain a relationship between a token and the real account number (e.g., within a database). Transactions involving a token in this manner may require an additional authorization step. For example, transactions may require that an authorization request message be provided to the token issuer, who may then query for the actual account number and forward a second authorization request message to an issuer of the account associated with the token. The use of a token prevents an unauthorized party from gaining access to an account number. In some embodiments, a token may be associated with a limited number of uses. For example, a token may be a one-time use token.

A "transaction" may be any interaction or exchange between two or more parties. For example, a transaction may include a first entity requesting resources from a second entity. In this example, the transaction is completed when the resources are either provided to the first entity or the transaction is declined.

In accordance with at least some embodiments, the disclosure is directed to a keyboard application in which at least one selectable item of the keyboard application is associated with a transaction. With a typical keyboard application, a user is able to select a selectable item and a corresponding character is entered into a text input field. In the disclosed keyboard application, selection of a selectable item may initiate a transaction and result in the completion of the transaction associated with the selectable item and information related to the completed transaction may be entered into the text input field. In some embodiments, the disclosed keyboard application may be imported into any application that allows use of a keyboard.

Figure 1:
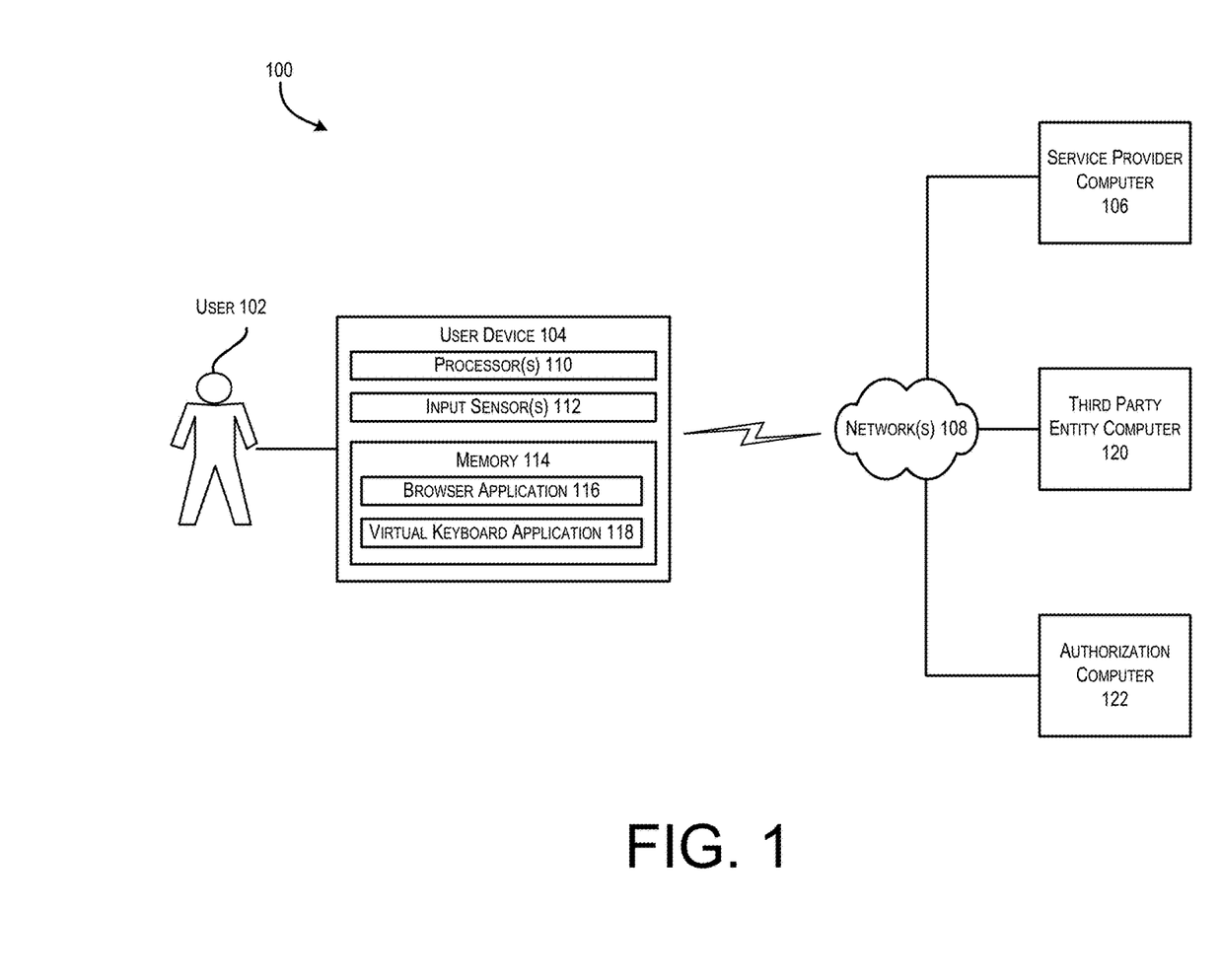
FIG. 1 depicts an illustrative example of a system or architecture in which techniques for providing instantiation of a keyboard application with selectable items mapped to transactions may be implemented.

FIG. 1 depicts an illustrative example of a system or architecture 100 in which techniques for providing instantiation of a keyboard application with selectable items mapped to transactions may be implemented. In architecture 100, one or more consumers and/or users 102 may utilize user devices 104. In some examples, the user devices 104 may be in communication with a service provider computer 106 via the network(s) 108, or via other communication means.

The user devices 104 may be any type of computing device such as, but not limited to, a mobile phone, a smart phone, a personal digital assistant (PDA), a laptop computer, a desktop computer, a server computer, a thin-client device, a tablet PC, etc. Additionally, user devices 104 may be any type of wearable technology device, such as a watch, earpiece, glasses, etc. The user device 104 may include one or more processors 110 capable of processing user input. The user device 104 may also include one or more input sensors 112 for receiving user input. As is known in the art, there are a variety of input sensors 112 capable of detecting user input, such as accelerometers, cameras, microphones, etc. The user input obtained by the input sensors may be from a variety of data input types, including, but not limited to, audio data, visual data, or biometric data. Embodiments of the application on the user device 104 may be stored and executed from its memory 114.

Turning to the contents of the memory 114 in more detail, the memory 114 may include a browser application 116. The memory 114 may also include a keyboard application 118 that is capable of implementing a keyboard application with mapped transaction data. Although sample architecture 100 depicts a keyboard application 118 as being included in the contents of the memory 114 of the user device 104, some embodiments may not include a keyboard application 118 in memory 114 of the user device 104. In those embodiments in which the keyboard application 118 is not included in memory 114, input received by the input sensors 112 may instead be processed by the service provider computer 106. For example, the user device may be a thin client device that depicts a keyboard application instantiated remotely.

In some embodiments, the keyboard application 118 may be configured to provide a plurality of selectable items, each mapped to a different transaction. In some embodiments, the keyboard application 118 may be configured to depict several third party entities (e.g., entities separate from and optionally unaffiliated with the service provider) that may be selected by a user. Each of the third party entities may be represented by a selectable item of the keyboard application. Upon selection of a selectable item representing a third party entity, the keyboard application 118 may initiate a transaction to be conducted with the selected third party entity. For example, the keyboard application 118 may depict a series of items available for purchase from selected third party retailers. Upon selection of an item of the depicted series of items, the keyboard application may contact the service provider computer 106, which may subsequently conduct a transaction with the third party entity.

As described briefly above, the browser application 116 may allow the users 102 to interact with a service provider computer 106, such as to store, access, and/or manage data, develop and/or deploy computer applications, and/or host web content. The one or more service provider(s) 106, perhaps arranged in a cluster of servers or as a server farm, may host the browser application 116. These servers may be configured to host a website (or combination of websites) viewable via the user device 104 or a web browser accessible by a user 102. Other server architectures may also be used to host the browser application 116. The browser application 116 may be capable of handling requests from many users 102 and serving, in response, various user interfaces that can be rendered at the user device 104 such as, but not limited to, a web site. The browser application 116 can be any type of website that supports user interaction, including social networking sites, electronic retailers, informational sites, blog sites, search engine sites, news and entertainment sites, and so forth. As discussed above, the described techniques can similarly be implemented outside of the browser application 116, such as with other applications running on the user device 104.

In some examples, the network(s) 108 may include any one or a combination of many different types of networks, such as cable networks, the Internet, wireless networks, cellular networks, and other private and/or public networks. While the illustrated example represents the users 102 accessing the browser application 116 over the network(s) 108, the described techniques may equally apply in instances where the users 102 interact with a service provider computer 106 via the user device 104 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

In some embodiments, the network 108 may provide access to a third party entity computer 120 and/or an authorization computer 122. A third party entity computer 120 may be any computer system (e.g., a server or group of servers) maintained by the third party entity such as a merchant. An authorization computer 122 may be any computer system (e.g., a server or group of servers) maintained by an authorizing entity (e.g., a credit card authorization entity such as an issuer). The service provider computer 106 may be in communication with the third party entity computer 120 and/or the authorization computer 122. In some embodiments, the service provider (e.g., a payment processor) may submit a purchase request to the third party entity computer 120 related to an item (any good or service, to include digital goods and services). The purchase request may be submitted on behalf of a user 102 or it may be submitted on behalf of the service provider computer 106 itself. For example, if a user 102 selects an item to be purchased from the third party entity computer 120, then the service provider may request the item from the third party entity using payment information associated with the service provider computer 106. The service provider computer 106 may also request authorization to charge payment information associated with the user 102 from the authorization computer 122. These requests may be made simultaneously or they may be made subsequently (one after the other). In some embodiments, the service provider computer 106 may charge the user 102 a different amount than what was authorized to be paid by the service provider to the third party entity. For example, the service provider computer 106 may charge the user 102 a markup or commission in addition to the price of the item.

Figure 2:
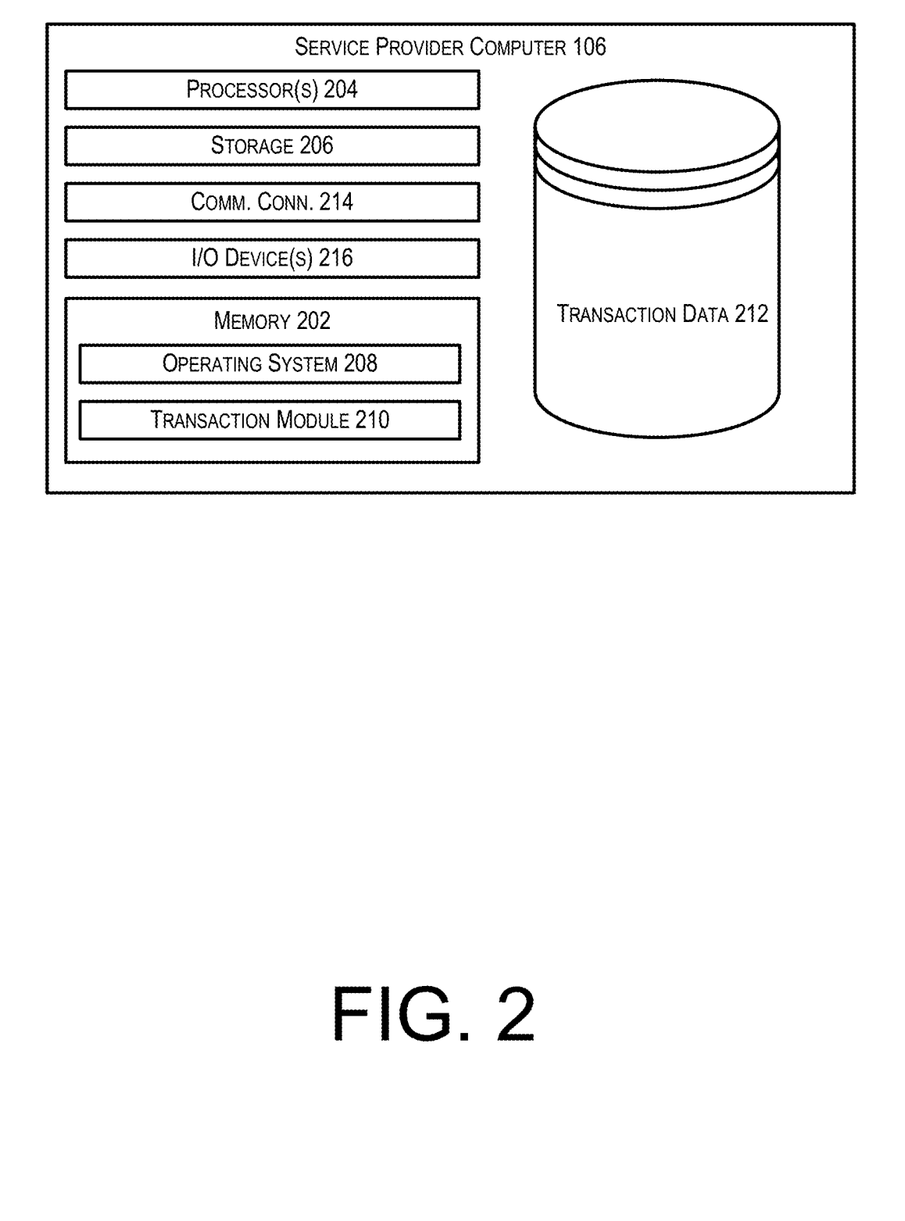
FIG. 2 depicts an illustrative example of a service provider computer capable of providing backend support for an embodiment of a keyboard application with selectable items mapped to transactions.

FIG. 2 depicts an illustrative example of a service provider computer capable of providing backend support for embodiment of a keyboard application with selectable items mapped to transactions. The service provider computer depicted in FIG. 2 may be an example service provider computer 106 of FIG. 1.

The service provider computer 106 may be any type of computing device including a remotely located server computer. Additionally, it should be noted that in some embodiments, the service provider computer 106 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider computer 106 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of service provider computer 106, the memory 202 may be volatile (such as random access memory (RAM)) and/or non-volatile (such as read-only memory (ROM), flash memory, etc.). The service provider computer 106 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the memory 202 may include multiple different types of memory, such as static random access memory (SRAM), dynamic random access memory (DRAM) or ROM. Turning to the contents of the memory 202 in more detail, the memory 202 may include an operating system 208 and one or more application programs or services for implementing the features disclosed herein including at least a module for receiving a selection of a third party entity and initiating a transaction with the third party entity (transaction module 210). The memory 202 may also include transaction data 212, which provides transaction data. In some embodiments, the transaction data 212 may be stored in a database.

The memory 202 and the additional storage 206, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 104 or the service provider computer 106. The service provider computer 106 may also contain communications connection(s) 214 that allow the service provider computer 106 to communicate with a stored database, another computing device or server, user terminals, and/or other devices on the network(s) 108. The service provider computer 106 may also include input/ output (I/O) device(s) and/or ports 216, such as for enabling connection with a keyboard, a mouse, a pen, a voice input device, a touch input device, a display, speakers, a printer, etc.

Turning to the contents of the memory 202 in more detail, the memory 202 may include an operating system 208, a database containing network data 216 and the one or more application programs or services for implementing the features disclosed herein, including a transaction module 210.

In some embodiments, the transaction module 210 may, in conjunction with the processor 204, be configured to receive data from the keyboard application and initiate a transaction on behalf of a user. In some embodiments, the user may be associated with an account or profile stored at the service provider computer 106. The service provider may maintain credit card or other payment information related to the user. In some embodiments, the service provider may maintain miles or other rewards points associated with the user. The transaction module 210 may, upon receiving a selection of a selectable item representing a third party entity from the keyboard application 118, initiate a transaction to purchase an item from that third party entity. A user of the user device 104 may provide to the service provider, via the keyboard application, a request including a third party entity, a customized graphic, and/or an amount to be included in a transaction. In response to receiving this information, the transaction module 210 may conduct a transaction with the third party entity by purchasing the selected item from the third party entity. As a result of the transaction, the transaction module 210 may generate an access credential that may subsequently be provided to a potential recipient.

Transaction data 212 may be predetermined or it may be dynamically generated. In some embodiments, a user may initiate a transaction using the keyboard application 118 to purchase one or more items from third party entities. In some embodiments, information related to an access credential resulting from a transaction made using the keyboard application 118 may be maintained at the service provider. In some embodiments, information related to an access credential may be stored locally on the user device (e.g., in an e-wallet or other electronic account).

Figure 3:
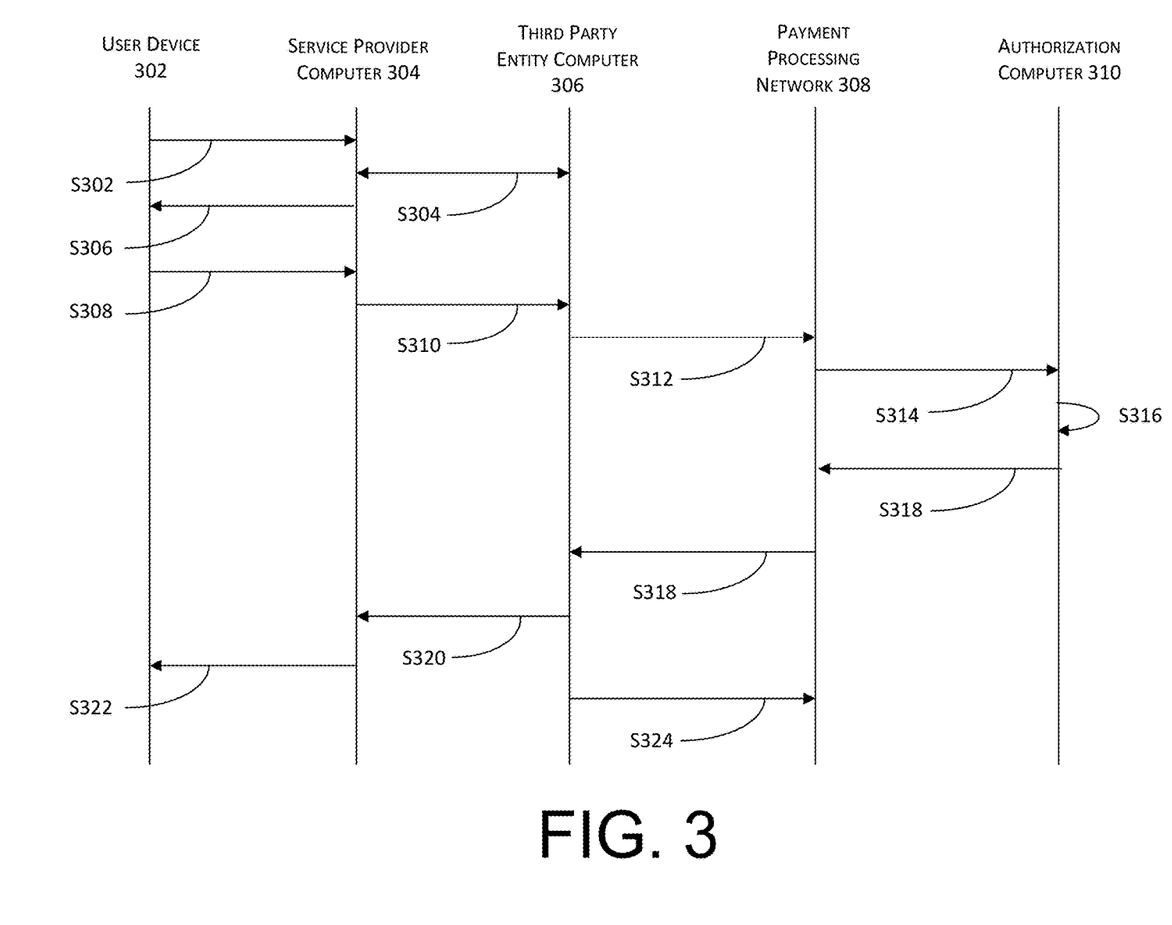
FIG. 3 depicts a process of engaging a third party entity to provide a selected product in accordance with at least some embodiments.

FIG. 3 depicts a process flow for engaging a third party entity to provide a selected item in accordance with at least some embodiments. The process described in FIG. 3 may involve interactions between one or more of a user device 302, a service provider computer 304, a third party entity computer 306, a payment processing network 308, and an authorization computer 310.

In some embodiments, a user may interact with a user device 302 to initiate the described process. For example, the user may execute a keyboard application from within a messaging application (or other suitable computer application) by electing to import a keyboard application into the messaging application. Upon selecting the disclosed keyboard application, the user may be presented with a keypad that includes one or more selectable items associated with transaction data. A selectable item may be associated with a particular third party entity, item, or transaction type. Upon selection of a selectable item, the user device 302 may convey the user's selection to a service provider computer 304 at S302. If the user has selected a selectable item associated with a third party entity, then the service provider computer 304 may contact the third party entity computer 306 at S304 to determine a list of current offerings associated with the third party entity at the time of the transaction.

Once the service provider computer 304 has identified a current list of offerings, the list may be communicated to the user device 302 at S306.

Upon receiving a list of offerings available from the third party entity, the user device 302 may render the images related to the list in order to present the list to the user. For example, upon selecting a retailer from a list of retailers on the keyboard application, the user device 302 may convey the selection to the service provider computer 304, which may subsequently contact the selected retailer to obtain a list of available product offerings. In this example, the list of product offerings may be provided to the user device to be presented to the user. In some embodiments, the list of product offerings may be presented as images of products that are available for purchase from the retailer. In some embodiments, the list of product offerings may be stylized images to be associated with a gift card or other prepaid account. Each product offering in the list of product offerings may be presented as a selectable item in the keyboard application. For example, upon selection of a third party entity, the keyboard application may display a keyboard application containing selectable items representing items available from the selected third party entity.

The user device 302 may then receive a selection of one or more of the selectable items (representing a product offering from the list of product offerings) from the user. In some embodiments, a price may be associated with the selectable item. In some embodiments, the user may provide a price. For example, where the selectable item represents a gift card offering, the user may select an amount to be added to the balance of the gift card. Information related to the selected selectable item and the amount of the transaction may be communicated to the service provider computer 304 at S308. The service provider computer 304 may subsequently identify payment information to be used in conducting the transaction. The payment information associated with the user may be stored in relation to an account with the service provider maintained on behalf of the user. The service provider computer 304 may then communicate the transaction details (including the identified payment information) to the third party entity computer 306 at S310.

Once the third party entity computer has obtained the transaction details, it may initiate a transaction using the provided payment information. The third party entity computer 306 may transmit an authorization request message to a payment processing network 308 at S312. In some embodiments, the authorization request message may be submitted to the payment processing network via an acquirer. An acquirer is typically a system or an entity (e.g., a bank) that has a business relationship with a particular merchant, a wallet provider or another third party entity. The acquirer may be communicatively coupled to the third party entity computer and the payment processing network and may issue and manage a financial account for the third party entity. The acquirer computer may be configured to route the authorization request for a transaction to the authorization computer via the payment processing network and route an authorization response received via the payment processing network to the third party entity computer. The payment processing network 308 may subsequently forward the authorization request message to an authorization computer 310 associated with the provided payment information at S314. At S316, the authorization computer 310 may determine whether or not to approve the transaction. For example, the authorization computer may decline the transaction if there is a high likelihood of fraud. In another example, the authorization computer may decline the transaction if the payment account has insufficient funds. Once the authorization computer 310 has decided whether to approve or decline the transaction, an authorization response message may be sent to the third party entity via the payment processing network 308 at S318.

The third party entity computer 306 may, upon receiving the authorization response message, determine whether the transaction has been approved or declined. In either case, the authorization response message may be provided to the service provider computer at S320 and/or the user device at S322. If the transaction has been authorized, the third party entity computer 306 may complete the transaction with the service provider computer 304. The third party entity computer 306, upon completion, may send a request for release of payment related to the transaction to the payment processing network 308 at S324. In some embodiments, the request for release of payment may be sent directly to the authorization computer. The authorization computer may query a data store for a response identifier or transaction information included in the request for release of payment to match it to an authorization request message.

Upon completion of the transaction between the third party entity computer 306 and the service provider computer 304, the third party entity computer may initiate a product fulfillment process. In some embodiments, the third party entity may generate a prepaid account to include a selected amount of funds. In some embodiments, the third party entity may generate a site from which a selected item may be downloaded. The third party entity may subsequently generate an access credential (e.g., a uniform resource locator (URL) or token) that may be used to access the prepaid account or the download site. Once generated, the access credential may be transmitted to the service provider computer 304 at S320 and subsequently to the user device 302 at S322. The access credential may then be transmitted to a second user device via the communication session of the messaging application.

Upon selection of the access credential, the third party entity may provide the selected item to the user. In some embodiments, the access credential may be a barcode that enables access to an electronic gift card or other prepaid account. The barcode may be scanned at a retail merchant to make a purchase using the gift card funds. In some embodiments, the third party entity may initiate a physical selection of, and subsequent shipping of, a selected physical item to the user that activates the access credential.

Figure 4:
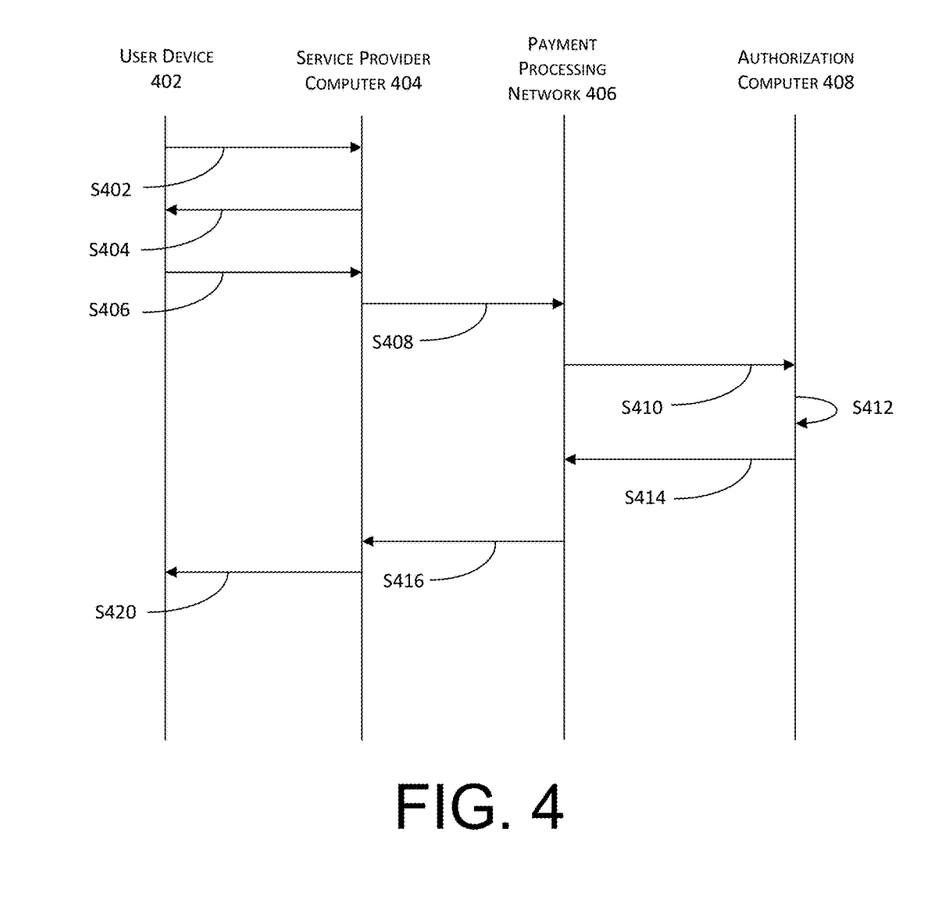
FIG. 4 depicts a process by which a service provider may provide an access credential associated with a selected item in accordance with at least some embodiments.

FIG. 4 depicts a process by which a service provider may provide an access credential associated with a selected item in accordance with at least some embodiments. In FIG. 4, a service provider may maintain an electronic catalog of items that are offered for sale. As depicted, the service provider may conduct the transaction directly (without involving a third party entity) from inventory held by the service provider. In some embodiments, the service provider may contact a third party entity before or after the transaction to replenish inventory. The process described in FIG. 4 may involve interactions between one or more of a user device 402, a service provider computer 404, a payment processing network 406, and an authorization computer 408.

Similar to the process described in FIG. 3 above, a user may interact with a user device 402 to initiate the described process. As above, the user may execute a keyboard application from within a messaging application (or other suitable computer application) by electing to import a keyboard application into the messaging application. Upon selecting the disclosed keyboard application, the user may be presented with a keypad that includes one or more selectable items associated with various items being offered by the service provider or a category of items being offered by the service provider. Upon selection of a selectable item representing a category of item, the user device may convey the user's selection to the service provider computer 404 at S402. The service provider computer 404 may then identify a list of items being offered within that category to be provided to the user device 302 at S404. Each item of the list of items may then be presented to the user as selectable items on the keyboard. Once a user has selected a selectable item from the list of selectable items, the user device 302 may convey the user's selection to the service provider at S406.

Once the service provider computer 304 has obtained the user's selection, it may initiate a transaction using the provided payment information. The service provider computer 304 may transmit an authorization request message to a payment processing network 406 at S408. The payment processing network 406 may subsequently forward the authorization request message to an authorization computer 408 associated with the provided payment information at S410. At S412, the authorization computer may determine whether or not to approve the transaction. For example, the authorization computer may decline the transaction if there is a high likelihood of fraud. In another example, the authorization computer may decline the transaction if the payment account has insufficient funds. Once the authorization computer 408 has decided whether to approve or decline the transaction, an authorization response message may be sent to the service provider computer via the payment processing network at S416.

The service provider computer 404 may, upon receiving the authorization response message, determine whether the transaction has been approved or declined. If the transaction has been authorized, the service provider computer may complete the transaction. The service provider computer, upon completion, may send a request for release of payment related to the transaction to the payment processing network at S418. In some embodiments, the request for release of payment may be sent directly to the authorization computer. The authorization computer 408 may query a data store for a response identifier or transaction information included in the request for release of payment to match it to an authorization request message.

Upon completion of the transaction, the service provider computer 404 may initiate a product fulfillment process. In some embodiments, the service provider may generate a prepaid account to include a selected amount of funds. In some embodiments, the service provider may generate a site from which a selected item may be downloaded. The service provider may subsequently generate an access credential (e.g., a uniform resource locator (url) or token) that may be used to access the prepaid account or the download site. Once generated, the access credential may be transmitted to the user device at S420. The access credential may then be entered into a text field of the communication session of the messaging application and transmitted to a second user device via the communication session.

In some embodiments, upon receiving the authorization response message (assuming that the transaction is approved), the service provider computer 404 may generate the access credential before requesting release of payment related to the transaction from the payment processing network. In this scenario, the service provider computer may "pre-authorize" the transaction by sending the authorization request message and may not complete the transaction until the access credential has been provided to a second user.

By way of illustrative example, consider a scenario in which a service provider maintains an electronic catalog. The electronic catalog may include a list of digital or physical items being offered. In this scenario, a user may import the keyboard application into a communication session within a messaging application. The keyboard application may depict a number of selectable items, each representing a category of items. By way of further illustration, the selectable items may represent categories such as gift cards, movies, music, e-cards, games, or any other suitable category of item. Assume, for the purposes of this example, that the user selects the music category. Upon selection of the music category, the service provider may query one or more data stores to identify a list of music items that should be presented to the user. In some embodiments, the list of items may be ordered based on the likelihood of the user's interest in those items. The service provider may then provide the list of music to the user as a keyboard of selectable items. Continuing with the example, the user may provide a selection of a particular music item (by selecting a selectable item in the keyboard application that represents the music item), which is conveyed to the service provider. In response, the service provider conducts a transaction to purchase the selected music item using payment information associated with the user. Once the purchase is complete, the keyboard application receives an access credential for the music item and places it into a text input field for the communication session. The access credential may be the music item itself, or it may provide a means of accessing the music item. For example, the access credential may be a link to download the music item.

It should be noted that with a typical keyboard application, a user would select a selectable item and a character associated with that selectable item would be entered into the text input field of the communication session. However, with the current disclosure, a user is able to select a selectable item and an access credential for an item is entered into the text input field of the communication session. In some embodiments, this may occur without further interaction from the user. For example, upon selection of the selectable item, the user need not provide any additional input to complete the transaction and the access credential from the transaction is entered into the text input field of the communication session. In some embodiments, the user may be notified if the transaction is declined. For example, if the authorization response message received by the service provider indicates that the transaction is not approved, then the service provider computer may cause the user device to display a message to the user that the transaction has not been completed.

Although the process described in FIG. 4 depicts portions S402 and S404, it should be noted that these portions of the process may not be present in every embodiment. In some embodiments, the user may not be provided with an option to select a category. For example, upon importation of the keyboard application, the user may be presented with various selectable items each representing a specific item offered. Additionally, it should be noted that in some embodiments, the selected item may be purchased using points (e.g., miles or other reward points) instead of a credit card number or other payment information.

Figure 5:
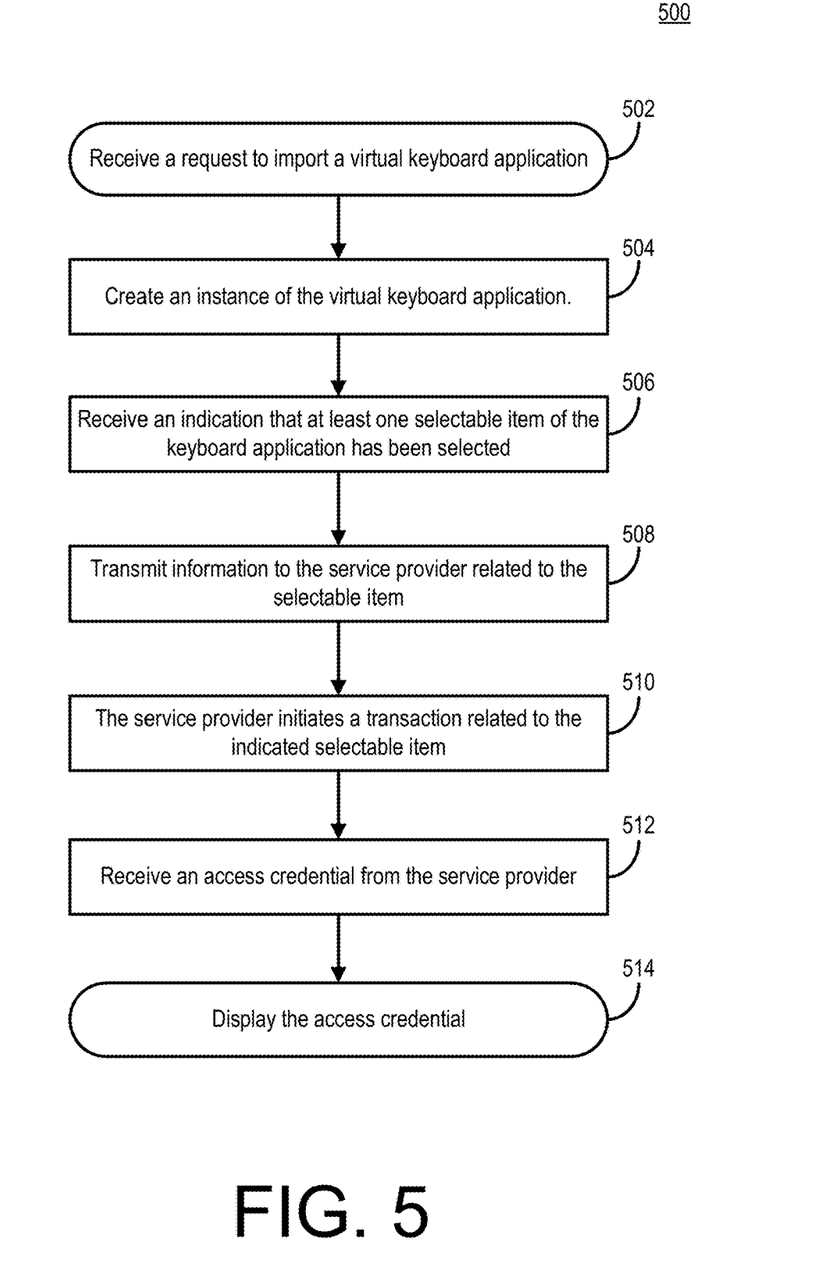
FIG. 5 depicts a process for engaging a third party to provide a selected product in response to a selection of a selectable item on a keyboard application in accordance with at least some embodiments.

FIG. 5 depicts a process for engaging a third party to provide a selected product in response to a selection of a selectable item on a keyboard application in accordance with at least some embodiments. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 500 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by at least the user device 104 shown in FIG. 1. The code may be stored on a computer-readable storage medium, for example, in the form of a computer program including a plurality of instructions executable by one or more processors. The computer-readable storage medium may be non-transitory.

Process 500 may begin at 502, when a request is received to import a keyboard application into a messaging application. In some embodiments, the messaging application may allow a user to enter text input into a text input field. Accordingly, the messaging application may be initiated with a default keyboard. The default keyboard may include a plurality of characters that are capable of being repeatedly selected to create words. In contrast, the disclosed keyboard application may include a plurality of selectable items, the selection of which is not capable of being repeatedly selected to create words. Instead, the selection of the plurality of selectable items may initiate a process to perform a transaction. Each selectable item of the plurality of selectable items may be associated with a different transaction. Accordingly, the plurality of selectable items may be non-character selectable items, or selectable items not associated with characters. Upon receiving the request to import the keyboard application, an instance of the keyboard application described may be instantiated at 504. The instance of the described keyboard application may then be used to replace the default keyboard, such that the characters are no longer present and have each been replaced with the selectable items of the keyboard application. A user may then select one or more of the selectable items.

The user device may receive an indication that a selectable item of the keyboard application has been selected at 506. In some embodiments, the user device may subsequently identify a transaction associated with the selectable item. The user device may communicate the selected selectable item and/or the associated transaction to a service provider computer at 508.

Upon receiving a selection of a selectable item from the user device, the service provider may initiate a transaction using payment information stored in relation to the user at 510. In some embodiments, the service provider may conduct a transaction with a third party entity associated with the selectable item. The transaction may be initiated by the service provider sending a request to gain access to, or purchase, an item associated with the selectable item. The transaction may be initiated by the service provider sending an authorization request message to an authorization computer (as described in FIG. 4). As a result of the initiated transaction, the service provider may generate or receive an access credential that may be used to gain access to the item associated with the selectable item. The access credential may then be provided to the user device at 512. The user device, upon receiving the access credential, may display the access credential to the user at 514. For example, the user device may enter the access credential in the text input field of the messaging application.

Figure 6:
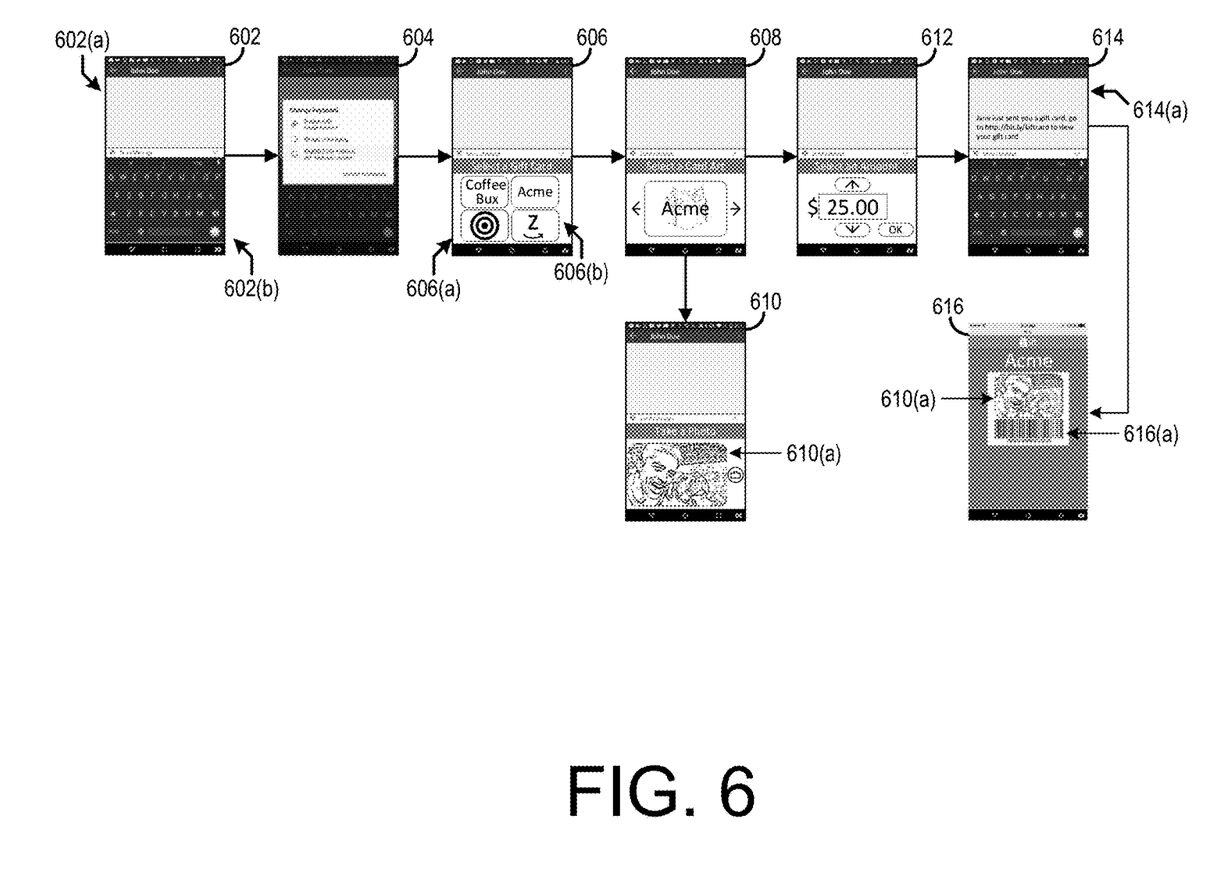
FIG. 6 depicts an embodiment of a keyboard application in accordance with at least some embodiments.

FIG. 6 depicts an embodiment of a keyboard application in accordance with at least some embodiments. In FIG. 6, a display of a user device is depicted. As depicted at 602, the display of the user device may be configured to depict an instance of a messaging application 602(*a*) that may be implemented to communicate with a second instance of the messaging application 602(*a*) executed on a second user device. In some embodiments, the messaging application may include a default keyboard 602(*b*) capable of entering characters into a text input field upon selection of the character from the keyboard. Although a messaging application is depicted, it should be appreciated that keyboard applications may be utilized in a number of alternative applications, to include any application in which textual input is enabled. There is no intention to limit this disclosure to the use of a keyboard application with a messaging application.

As depicted at 604, the messaging application may be configured to allow importation of a custom keyboard instance. In accordance with at least some embodiments, the functionality to import the custom keyboard may be activated via an icon located on the graphical user interface (GUI) of the messaging application. In some embodiments, the functionality to import the custom keyboard may be activated via a button located on the user device itself or via an icon associated with the operating system of the user device. In some embodiments, the user may be required to enter a pin or password in order to access the keyboard application. For example, upon electing to import the keyboard application, the user may be prompted to enter his or her password before the keyboard application is imported and/or rendered.

As depicted at 606, an instance of a keyboard application 606(*a*) may be instantiated within the messaging application. In some embodiments, the instance of the keyboard application 606(*a*) may include a plurality of selectable items representing items (e.g., images of gift cards) 606(*b*) that are available for purchase from a variety of third party entities (e.g., retail establishments). In some embodiments, each selectable item of the plurality of selectable items may be associated with a different transaction. Upon instantiation of the instance of the keyboard application, the user is given the ability to select a product image from the plurality of product images. In some embodiments, a service provider may be notified of the selection of a product image by a user of the user device.

As depicted at 608, once the user has selected a particular product image, the user may be given the ability to choose a product art image. For example, upon selecting a selectable item representing a third party entity, the user may select an image to be associated with the selected product. In some embodiments, the user device may have stored in memory a number of product representations associated with the product. In some embodiments, a number of product representations associated with the product may be provided to the user device by the service provider.

As depicted at 610, in some embodiments, the user may be given the ability to select or capture a custom image. For example, the user device may contain a digital camera device capable of capturing a digital image. In this example, the user may be given the ability to capture an image to be associated with the selected product. The captured image may be transmitted to the service provider computer by the user device.

As depicted at 612, the user may indicate an amount of currency to be associated with the selected product. In some embodiments, the user may confirm a predetermined purchase amount. For example, the user may select a product image associated with an item. At 612, the user may be requested to confirm that he or she is willing to authorize a payment for the price of the product as well as any applicable fees, commissions, and/or taxes. Upon confirmation by the user, the service provider may initiate a transaction with a third party service for the selected product. In some cases, the service provider may maintain an inventory of the product associated with the product image. In these cases, the service provider may initiate a payment authorization for the product and provide the product from its own inventory as opposed to initiating a transaction with a third party entity.

As depicted at 614, once payment for the product associated with the selected product image has been authorized, an access credential may be provided. In some embodiments, the access credential may be entered into a text input field of a messaging application. In some embodiments, the access credential may be provided directly to a second instance of the messaging application executed on a second user device 614(*a*) with which the first instance of the messaging application is in communication. In some embodiments, the access credential may include the selected product art image. In accordance with at least some embodiments, an amount of currency associated with the transaction may be added to an e-wallet or other electronic currency account associated with a user of the second user device.

In some embodiments, the transaction may not be completed until the access credential is used. For example, if the access credential is a link to download digital content, then the transaction may not be completed until the content is downloaded. In this scenario, the transaction may be authorized using the process described in FIG. 3 and/or the process of FIG. 4, but the request for release of payment may not be sent until the link has been accessed and/or the digital content has been downloaded. In this way, a user who mistakenly selects a selectable item and has an access credential entered into the text input field may simply delete the access credential without sending it in order to cancel the transaction.

Depicted at 616 is an example transaction result page. The transaction result page may include the selected product art image 610(*a*). In some embodiments, the transaction result page may include instructions for gaining access to the selected product. For example, the transaction result page may provide an input field for entering an address to which a physical product should be shipped. In some embodiments, the transaction result page may include a machine-readable code 616(*a*) configured to allow access to the product or funds associated with the product. For example, the transaction result page may depict an electronic gift card image with a machine-readable code 616(*a*) that may be used to gain access to funds stored on the electronic gift card. In this example, the user may present the transaction result page to a merchant associated with the electronic gift card (e.g., a retail store of the third party entity) in order to make a purchase using the gift card.

Figure 7:
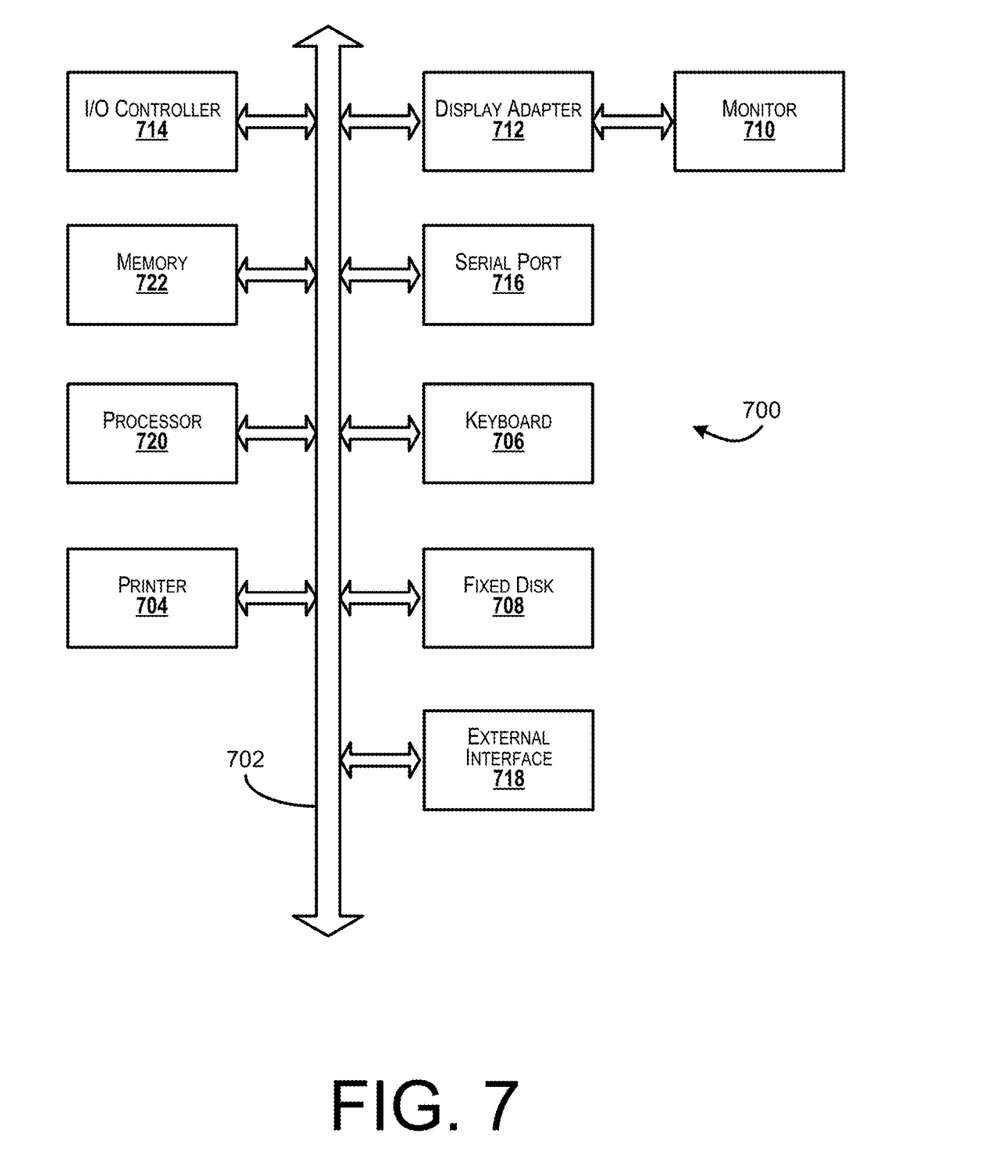
FIG. 7 depicts aspects of elements that may be present in a computer device and/or system configured to implement a method and/or process in accordance with some embodiments of the present invention.

In accordance with at least some embodiments, the system, apparatus, methods, processes and/or operations for a keyboard application configured to engage a third party to provide a selected product may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 7 depicts aspects of elements that may be present in a computer device and/or system 700 configured to implement a method and/or process in accordance with some embodiments of the present invention. The subsystems shown in FIG. 7 are interconnected via a system bus 702. Additional subsystems include a printer 704, a keyboard 706, a fixed disk 708, and a monitor 710, which is coupled to a display adapter 712. Peripherals and input/output (I/O) devices, which couple to an I/O controller 714, can be connected to the computer system by any number of means known in the art, such as a serial port 716. For example, the serial port 716 or an external interface 718 can be utilized to connect the computer device 700 to further devices and/or systems not shown in FIG. 7 including a wide area network such as the Internet, a mouse input device, and/or a scanner. The interconnection via the system bus 702 allows one or more processors 720 to communicate with each subsystem and to control the execution of instructions that may be stored in a system memory 722 and/or the fixed disk 708, as well as the exchange of information between subsystems. The system memory 722 and/or the fixed disk 708 may embody a tangible computer-readable medium.

A computer system can include a plurality of the same components or subsystems, e.g., connected together by external interface 30 or by an Internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

Embodiments of the invention provide for a number of technical advantages. For example, embodiments of the invention enable a user to initiate a transaction from within a messaging application without executing a separate application. This, in turn, allows a user to commit to a transaction with a single action and without providing payment information via the messaging application (the payment information is stored at the service provider). Accordingly, the disclosure significantly reduces the number of steps required to convey transaction results to a second user. For example, in a conventional system, in order to send an access credential to a second user, a first user may need to visit a website or utilize a separate application to select a transaction to be performed. The first user may then be required to complete a purchase request and provide payment information. Upon successfully completing the transaction, the first user may need to write down the access credential or copy the provided access credential into the temporary memory of the user device. The user may subsequently need to open the messaging application and paste the access credential into the text input field. Each of these steps exposes the first user to an opportunity for fraud and/or an opportunity to make a mistake. Additionally, the invention provides a means to initiate a transaction that is compatible with virtually any application that enables text input.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium according to an embodiment of the present invention may be created using a data signal encoded with such programs. Computer-readable media encoded with the program code may be packaged with a compatible device or provided separately from other devices (e.g., via Internet download). Any such computer-readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
 rendering, on a display of a user device by a processor executing a keyboard application, a first keyboard comprising a plurality of characters that are capable of being repeatedly selected to create words within a text field;

receiving, by the processor of the user device, a request to change the first keyboard to a second keyboard;

rendering, on the display of the user device, by the processor executing the keyboard application, a second keyboard comprising a plurality of selectable product images, wherein each of the plurality of selectable product images is associated with a retail establishment computer of a plurality of retail establishment computers, and wherein each selectable product image of the plurality of selectable product images is associated with a transaction to be completed with the associated retail establishment computer of the plurality of retail establishment computers;

receiving a selection of a selectable product image of the plurality of selectable product images;

determining the retail establishment computer and the transaction associated with the selected selectable product image;

initiating the transaction with the retail establishment computer;

receiving, from the retail establishment computer, an access credential associated with the transaction; and presenting the access credential within the text field.

2. The method of claim 1, wherein the second keyboard comprises an image map having different areas each represented by a selectable product image.

3. The method of claim 2, wherein each area of the different areas is associated with a different set of instructions for initiating the transaction.

4. The method of claim 1, wherein the access credential is further transmitted to a second user device via the text field.

5. The method of claim 1, wherein initiating the transaction results in sending a request to a service provider to conduct the transaction.

6. The method of claim 1, wherein the transaction is related to a resource managed by the retail establishment computer and the access credential provides access to the resource.

7. The method of claim 1, wherein the access credential is configured to be interpreted by an access device.

8. The method of claim 1, wherein the access credential is a machine-readable code.

9. The method of claim 1, wherein the access credential is a token associated with a token account.

10. The method of claim 1, wherein selection of the selectable product image in the plurality of selectable items also causes the processor executing the keyboard application to insert an icon representing the transaction into the text field.

11. The method of claim 10, wherein the text input field is a text field of an instance of a messaging application.

12. The method of claim 11, wherein the icon is transmitted to a second instance of the messaging application via an active communication session.

13. A user device comprising:
a processor;
a display; and
a memory including a keyboard application comprising instructions that, when executed with the processor, cause the user device to, at least:
render, on the display of the user device by the processor executing the keyboard application, a first keyboard comprising a plurality of characters that are capable of being repeatedly selected to create words within a text field;
receive, by the processor of the user device, a request to change the first keyboard to a second keyboard; and
render, on the display of the user device, by the processor executing the keyboard application, a second keyboard comprising a plurality of selectable product images, wherein each of the plurality of selectable product images is associated with a retail establishment computer of a plurality of retail establishment computers and wherein selection of a selectable product image of the plurality of selectable product images is associated with a transaction to be completed with the associated retail establishment computer of the plurality of retail establishment computers;
receive a selection of a selectable product image of the plurality of selectable product images;
determine the retail establishment computer and the transaction associated with the selected selectable product image;
initiate the transaction with the retail establishment computer;
receive, from the retail establishment computer, an access credential associated with the transaction; and
present the access credential within the text field.

14. The method of claim 1, further comprising receiving a selection of denomination amount to be associated with the transaction, wherein the transaction is initiated with the retail establishment computer for the denomination amount.

15. The method of claim 8, wherein the machine-readable code is a two-dimensional code.

* * * * *